United States Patent Office 2,862,892
Patented Dec. 2, 1958

2,862,892

PREPARATION OF WEAKLY BASIC ANION-EXCHANGE RESINS FROM CHLOROHYDRIN ESTERS OF ACRYLIC TYPE ACIDS

Jesse C. H. Hwa, Levittown, Pa., assignor to Rohm & Haas Company, Philadelphia, Pa., a corporation of Delaware No Drawing. Application November 28, 1956
Serial No. 624,742

7 Claims. (Cl. 260—2.1)

This invention relates to the preparation of insoluble anion-exchange resins which are weakly basic. It has particular reference to a new and greatly improved process for preparing the weakly basic anion-exchange resins of the type which I have disclosed in U. S. Patent No. 2,630,429, dated March 3, 1953.

This new process has considerable advantages in its actual commercial application over the process disclosed in the said Patent No. 2,630,429. The new method is far simpler, faster, and cheaper to perform than was its predecessor, and is less likely to cause the operator difficulties with the result that much less skill is required to make the resins with my new process than was heretofore necessary. For example, in the former method, which in commercial practice depends almost exclusively on suspension polymerization techniques, there was always a risk that the epoxy group of the glycidyl methacrylate resin would react with the water to form a glycol group which is incapable of being aminated. To avoid this, special skill in handling, controlling temperature, pH, etc. was paramount. By contrast, with the present improvement no such care is necessary because the chlorine atom, which is the reactive member of the chlorohydrin methacrylate resin that features the present invention, does not react with water under these conditions.

The products of this invention are made by reacting ammonia or a primary or a secondary amine with an insoluble, cross-linked polymer of a monochlorohydrin ester of acrylic acid or of an alpha-substituted acrylic acid such as alpha-methylacrylic acid. Reaction takes place between the chlorine atom of the monochlorohydrin ester and the hydrogen atom attached to the nitrogen atom of the ammonia compound.

The process can be better understood from a consideration of a preferred embodiment of this invention; namely the preparation of an anion-exchange resin by the reaction of dimethylamine and a cross-linked polymer of the chlorohydrin methacrylate:

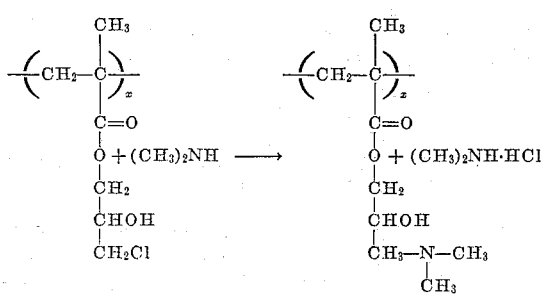

The character $x$ is employed in the conventional way to indicate that the structural unit shown is only one of many such units joined together in the insoluble polymeric chlorohydrin ester.

The scope of the invention is indicated by the following representation:

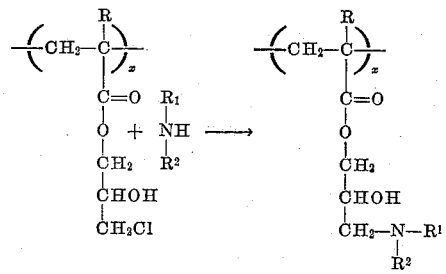

In the above, R represents an atom of hydrogen or an alkyl group of one to four carbon atoms; and $NHR^1R^2$ represents ammonia or a primary or a secondary amine in which $R^1$ and $R^2$ stand for a hydrogen atom or an organic radical. Those amines are preferred in which the organic radicals represented by $R^1$ and $R^2$ are unsubstituted hydrocarbon groups or are hydrocarbon radicals containing primary or secondary amino groups as substituents, as in the case of the polyalkylene-polyamines, typified by diethylene-triamine.

It is to be noted that the chlorine atom of the polymeric chlorohydrin ester reacts with the amine during the reaction but that the rest of the macromolecule, including the group R, remains inert and intact. Furthermore, the organic groups attached to the amino nitrogen atoms are not altered; and all that is required of the amine is that it contains at least one reactive amino hydrogen atom, as in a primary amino group, $-NH_2$, or a secondary amino group, $=NH$. Amino groups then become attached to the insoluble macromolecules and as a consequence, the product acquires the properties of a weakly basic anion-exchange resin.

The monomeric chlorohydrin esters which are polymerized, cross-linked, and then reacted with a primary or a secondary amine to produce the anion-exchange resins of this invention include the chlorohydrin esters of acrylic acid, alpha-methylacrylic acid, alpha-ethylacrylic acid, the isomeric alpha-propylacrylic acids, and the isomeric alpha-butylacrylic acids. These monomeric esters are known and can conveniently be prepared by reacting the acid with epichlorohydrin, for example, according to the method of U. S. Patent No. 2,335,813 of November 30, 1943. These esters, which it should be understood can be made by methods other than the one disclosed in that patent, can have any one of the following structures:

$$CH_2=C(R)-COOCH_2CHOHCH_2Cl$$

or

$$CH_2=C(R)-COOCH_2CHClCH_2OH$$

or

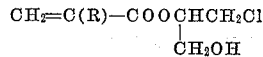
$$CH_2=C(R)-COOCHCH_2Cl$$
$$\qquad\qquad\qquad\quad CH_2OH$$

in which structures R represents a member of the class consisting of a hydrogen atom and an alkyl group containing one to four carbon atoms.

The chlorohydrin ester is polymerized together with a cross-linking agent so as to produce insoluble polymeric products. Cross-linking agents are well known and embrace those compounds which are copolymerizable with the chlorohydrin esters and which contain a plurality of non-conjugated vinylidene groups, $CH_2=C<$. Currently, divinylbenzene is the most common cross-linking agent but others which are operable include divinylpyridine, divinyltoluenes, divinylnaphthalenes, diallyl phthalate, ethylene glycol diacrylate or dimethacrylate, divinylxylene, divinylethylbenzene, divinyl sulfone, allyl ethers of glycol, glycerol, pentaerythritol and resorcinal, divinylketone, divinyl sulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di-(α-methylmethylene, sulfonamido)-ethylene, trivinylbenzene, trivinylnaphthalene, and polyvinylanthracenes.

By varying the amount of the cross-linking agent used in the preparation of the copolymer, variations can be made in the physical properties of the polymeric material which carry through to the finished product. Thus, for example, higher amounts of cross-linker make for products of higher density. In general, the amount of copolymerizable cross-linking agent can vary from 0.1 to 40% of the total polymerizable materials on a molar basis. In practice, however, it is preferred to use at least 0.5%; and for most purposes no benefit is derived from using over about 10%.

The polymeric base material can be formed by any of the known polymerization processes such as polymerization in mass, in solvents for the monomeric materials, or in emulsion or suspension in a liquid which is not a solvent for the monomers. The last is the preferred method because it produces the polymer in the form of small spheroids or beads, the size of which can be regulated and controlled.

In following the preferred method it is advantageous to thin out the organic monomer by adding thereto an organic, miscible, inert diluent which is water insoluble as, for example, toluene, benzene, etc. At the end of the polymerization the diluent will be imbibed by the insoluble resin. The resin which contains the diluent is suitable for amination without the prior removal of the diluent.

The polymerization of the chlorohydrin ester and the copolymerizable cross-linking agent is accelerated by means of well known catalysts. These catalysts include ozone; ozonides; organic peroxidic compounds such as acetyl peroxide, lauroyl peroxide, stearoyl peroxide, tert-butyl hydroperoxide, benzoyl peroxide, tert-butylperbenzoate, ditert-butyl diperphthalate, ditert-butyl peroxide, and the barium salt of tert-butyl hydroperoxide; inorganic agents such as barium peroxide, sodium peroxide, hydrogen peroxide; azo compounds such as azobisisobutyronitrile; and the so-called "per salts" such as the water-soluble perborates, persulfates, and perchlorates. The catalysts are employed in suitable amounts ranging from 0.1 to about 2.0% based on the weight of the monomeric material to be polymerized.

The amines which are employed are preferably used in the form of the free base. The prime requirement is that they contain at least one amino-nitrogen atom to which is attached one or two reactive hydrogen atoms. The amines which are preferred are those in which the amino group or groups are attached to hydrocarbon groups. Other amines may be used, however, including those wherein the hydrocarbon group of the amine carries a substituent group. Such amines are exemplified by ethanolamine and diethanolamine. Primary and secondary amines are operable, as well as mixtures of the two types, and also polyamines including those having both primary and secondary amino groups such as the polyalkylene-polyamines. Tertiary amines also react with the polymeric chlorohydrin esters but give rise to anion-exchange resins of quite different characteristics which are the subject of my co-pending application for Letters Patent, Serial No. 624,743, filed November 28, 1956. In case a polyamine is utilized which has one or more tertiary amines, the balance being primary or secondary, the resulting anion-exchange resin will have still different characteristics as disclosed in my co-pending application for Letters Patent, Serial No. 624,744, filed November 28, 1956.

The substituents on the amino-nitrogen atoms can be hydrogen, aliphatic, aromatic, cycloaliphatic, araliphatic, and alkaromatic. The following typify those amines which are all suitable in this invention when used individually or in mixtures with one another: ammonia, methylamine, dimethylamine, n-butylamine, iso-butylamines, the isomeric dibutylamines, aniline, benzidine, o-, m-, and p-toluidines, xylidines, alpha- and beta-naphthylamines, benzylamine, dibenzylamine, phenylenediamine, benzylaniline, benzylethylamine, methylaniline, cyclohexylamine, dicyclohexylamine, diethylenetriamine, triethylenetetramine, tetraethylenepentamine, and propylenediamine.

The reaction of the amine and the polymeric chlorohydrin ester is best carried out as follows: Particles of the insoluble resin (which can contain some of the inert diluent if such a material was employed as described above) are suspended by agitation in a liquid which is a solvent for the amine, such as water or an alcohol, dioxane, toluene or the like, and then agitating the reaction mixture while it is maintained at a temperature from about 0° C. to the refluxing temperature. Since, however, the process is decidedly less efficient at the lower temperatures, it is much preferred to employ a temperature from about 50° C. to the boiling point of the reaction mixtures.

While a catalyst is not necessary, it is nevertheless suggested that one be employed. Catalysts which are recommended include iodides of alkali metals such as sodium iodide, potassium iodide, etc.

When the reaction is complete, the resinous product containing primary, secondary, or tertiary amino groups is separated from the reaction mixture as, for example, by steam distillation, decantation, or filtration, and is washed free of contaminants.

The following examples, in which all parts are by weight, serve to illustrate the process of this invention which in its broader aspects is a novel method of converting insoluble, cross-linked polymers of chlorohydrin esters of acrylic and alpha-substituted acrylic acids into anion-exchange resins containing, as polar, anion-adsorbing groups, primary, secondary, or tertiary amino groups.

*Example 1*

(a) Into a container equipped with thermometer, mechanical stirrer, and reflux condenser were poured 3000 parts of water containing 0.5% of a commercial dispersing agent. To this stirred solution was added a mixture of 1450 parts of monomeric 3-chloro-2-hydroxypropyl methacrylate, 30 parts of divinylbenzene, 22 parts of ethyl styrene and 15 parts of benzoyl peroxide. The mixture was stirred for ten minutes at 40° to 50° C. after which it was heated to 80° to 85° C. and held there for five hours. The mixture was then filtered; the hardened, insoluble beads of polymeric, cross-linked 3-chloro-2-hydroxypropyl methacrylate were washed thoroughly first with water and then with ethanol. After drying at 105° C. for five hours, the beads were uniform, individual and hard and had an average estimated size of 0.2 mm. diameter. The yield of the dry product was 1375 parts, corresponding to 91.5% of the theoretical. The beads had 17.1% chlorine by analysis. The described process is also suitable for the preparation of insoluble, cross-linked polymers of all the chlorohydrin esters described above.

(b) In a similar manner a monomer mixture consisting of 669 parts of 3-chloro-2-hydroxypropyl methacrylate, 31 parts of ethylene glycol dimethacrylate, 7 parts of benzoyl peroxide, and 300 parts of toluene was converted to toluene-swollen insoluble beads by suspension polymerization in 2500 parts of water. After thorough washing with water, the spherical beads still retained the imbibed toluene solvent and could be used without drying. The toluene-laden, water wet resin contained 48.4% solids.

Example 2

(a) In a container equipped with thermometer, mechanical stirrer, and a reflux condenser were introduced 44 parts of the dried cross-linked polymeric 3-chloro-2-hydroxylpropyl methacrylate prepared by the method given in Example 1(a), and 140 parts of toluene. The mixture was stirred and heated to reflux for one hour. Then 48.5 parts of diethylenetriamine was added into the mixture and refluxing was continued for sixteen more hours. After cooling, the mixture was filtered and the remaining toluene was removed by steam distillation. The resin was then thoroughly washed with water. The product was still in the form of individual beads and was capable of adsorbing acids from aqueous solutions. From this reaction 107 parts of the moist resin was obtained. The resin had 47.6% solids, 1.8% chlorine, 11.4% nitrogen (both on dry weight basis), 41.6 lbs./cu. ft. of density, 7.67 milliequivalents per gram dry and 2.44 milliequivalents per ml. wet of anion-exchange capacity.

(b) Likewise by the methods of Example 1(a) and 2(a), a 3-chloro-2-hydroxypropyl methacrylate-4% divinylbenzene resin can be converted by diethylenetriamine to an anion-exchange resin having 57.1% solids, 43.6 lbs./cu. ft. density, 7.08 milliequivalents per gram dry and 2.83 milliequivalents per ml. wet of anion-exchange capacity.

Example 3

Other anion-exhange resins were made in the same way as the methods described in the foregoing two examples by merely substituting ammonia or the other primary and secondary amines described above for the diethylenetriamine. All of the products were of the weakly basic type.

I claim:

1. A process for preparing weakly basic anion-exchange resins containing polar amino groups which comprises reacting an amino compound from the class consisting of ammonia, methylamine, dimethylamine, monobutylamines, dibutylamines, aniline, benzidine, o-, m-, and p-toluidines, xylidines, alpha-naphthylamine, beta-naphthylamine, benzylamine, dibenzylamine, phenylenediamine, benzylaniline, benzylethylamine, methylaniline, cyclohexylamine, dicyclohexylamine, diethylenetriamine, triethylenetetramine, tetraethylenepentamine, propylenediamine, ethanolamine, and diethanolamine with an insoluble, cross-linked, resinous product which is a copolymer of a mixture containing (a) 90 to 99.5% of a chlorohydrin ester which is one of the class of compounds designated by the formulae:

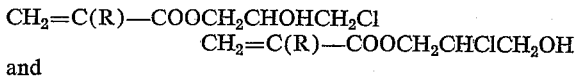

and

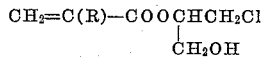

in which R represents a member of the class consisting of a hydrogen atom and an alkyl group containing one to four carbon atoms, and (b) 0.5 to 10% of a compound which is copolymerizable with said ester and which contains at least two non-conjugated vinylidene groups, $CH_2=C<$.

2. A process for preparing weakly basic anion-exchange resins containing polar amino groups which comprises reacting methylamine with an insoluble, cross-linked resinous product which is a copolymer of a mixture containig 90 to 99.5% of chlorohydrin methacrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinyl sulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di-(α-methylmethylene sulfonamido)-ethylene, trivinylbenzene, trivinylnaphthalene, and polyvinylanthracenes.

3. A process for preparing weakly basic anion-exchange resins containing polar amino groups which comprises reacting dimethylamine with an insoluble, cross-linked, resinous product which is a copolymer of a mixture containing 90 to 99.5% of chlorohydrin methacrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinyl sulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, trially phosphate, N,N'-methylenediacrylamide, N,N'-methylenedimethacrylamide, N,N'-ethylenediacrylamide, 1,2-di(α-methylmethylene sulfonamido)-ethylene, trivinylbenzene, trivinylnaphthalene, and polyvinylanthracenes.

4. A process for preparing weakly basic anion-exchange resins containing polar amino groups which comprises reacting diethylenetriamine with an insoluble, cross-linked resinous product which is a copolymer of a mixture containing 90 to 99.5% of chlorohydrin methacrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divenyltoluenes, divenylnaphthalenes, diallyl phthalate, ethylene glycol diacrylate, ethylene glycol dimenthacrylate, divenylxylene, divinylethylbenzene, divinylsulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl carballylate, triallyl aconitate, triallyl citrate, triallyl phosphate, N,N'-methylenediacrylamide, N,N'-methylenedimethacrylamide, N,N'-ethylenediacrylamide, 1,2-di-(α-methylmethylene sulfonamido)-ethylene, trivinylbenzene, trivinylnaphthalene, and polyvinylanthracenes.

5. A process for preparing weakly basic anion-exchange resins containing polar amino groups which comprises reacting diethylenetriamine with an insoluble, cross-linked resinous product which is a copolymer of a mixture containing 90 to 99.5% of chlorohydrin acrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinyl sulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N' - methylenedimethacrylamide, N,N'-ethylenediacrylamide, 1,2-di-(α-methylmethylene sulfonamido)-ethylene, trivinylbenzene, trivinylnaphthalene, and polyvinylanthracenes.

6. A process for preparing weakly basic anion-exchange resins containing polar amino groups which comprises reacting dimethylamine with an insoluble, cross-linked resinous product which is a copolymer of a mixture containing 90 to 99.5% of chlorohydrin acrylate and 0.5 to 10% of a compound which contains a plurality of non-conjugated vinylidene groups and which is copolymerizable with said chlorohydrin ester, said compound being selected from the group of cross-linking agents consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinyl sulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N' - methylenedimethacrylamide, N,N'-ethylenediacrylamide, 1,2 - di - (α - methylmethylene sulfonamido)-ethylene, trivinylbenzene, trivinylnaphthalene, and polyvinylanthracenes.

7. A process for preparing weakly basic anion-exchange resins containing polar amino groups which comprises reacting methylamine with an insoluble, cross-linked resinous product which is a copolymer of a mixture containing 90 to 99.5% of chlorohydrin acrylate and 0.5 to 10% of a compound which contains a plurality of non-conjugated vinylidene groups and which is copolymerizable with said chlorohydrin ester selected from the group consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, allyl ethers of glycol, of glycerol, of pentaerythritol, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicone, diallyl silicate, triallyl tricarballylate, triallyl aconitate, triallyl citrate, triallyl phosphate, N,N'-methylenediacrylamide, N,N' - methylenedimethacrylamide, N,N'-ethylenediacrylamide, 1,2 - di - (α - methylmethylene sulfonamido)-ethylene, trivinylbenzene, trivinylnaphthalene, and polyvinylanthracenes.

References Cited in the file of this patent

UNITED STATES PATENTS

| | | |
|---|---|---|
| 1,860,098 | Jaeger | May 24, 1912 |
| 1,977,251 | Stallman | Oct. 16, 1924 |
| 2,129,694 | Izzard | Sept. 13, 1938 |
| 2,630,429 | Hwa | Mar. 3, 1953 |